United States Patent
Ryan et al.

(10) Patent No.: US 9,868,861 B2
(45) Date of Patent: Jan. 16, 2018

(54) ADHESION PROMOTER AND METHOD OF MANUFACTURE THEREOF

(71) Applicants: Ione Ryan, Houston, TX (US); Mark Cormier, Mesa, AZ (US)

(72) Inventors: Ione Ryan, Houston, TX (US); Mark Cormier, Mesa, AZ (US)

( * ) Notice: Subject to any disclaimer, the term of this patent is extended or adjusted under 35 U.S.C. 154(b) by 0 days.

(21) Appl. No.: 14/165,579

(22) Filed: Jan. 28, 2014

(65) Prior Publication Data
US 2015/0210898 A1    Jul. 30, 2015

(51) Int. Cl.
| | | |
|---|---|---|
| C09D 183/04 | (2006.01) | |
| C09D 5/00 | (2006.01) | |
| C09D 7/00 | (2006.01) | |

(52) U.S. Cl.
CPC ............. *C09D 5/002* (2013.01); *C09D 7/001* (2013.01)

(58) Field of Classification Search
None
See application file for complete search history.

(56) References Cited

U.S. PATENT DOCUMENTS 5,069,942 A * 12/1991 Anderson ......... B32B 17/10018
              427/387
2009/0081262 A1 * 3/2009 Toledano ............... A01N 25/26
              424/401
2011/0054074 A1 * 3/2011 Jonschker ............. C08F 283/12
              523/400
2014/0238580 A1 * 8/2014 Zhang ................. B32B 37/1284
              156/99

OTHER PUBLICATIONS

A guide to Silane SOlutions. Adhesives and Sealants. by Dow Corning.*

* cited by examiner

*Primary Examiner* — Melvin C Mayes
*Assistant Examiner* — Colette Nguyen
(74) *Attorney, Agent, or Firm* — Spradley PLLC; Michael Spradley

(57) ABSTRACT

The disclosure teaches an adhesion promoter comprising a first blend and second blend. The first blend can comprise water and a silane base. The first blend can comprise a first blend ratio of the silane base to the water of between 1:20 and 1:60, measured in liquid volume. The second blend can comprise an isopropyl alcohol. The disclosure further teaches a method for manufacturing an adhesion promoter. The method can comprise mixing a first ratio between 20 and 60 parts water with 1 part silane base to create a first blend. Next, the method can comprise mixing a second ratio between 20 and 60 parts isopropyl alcohol with between 0 to 1 part wetting agent. Then the method can comprise mixing a solution ratio between 30 and 50 parts of the first blend with 1 part the second blend.

14 Claims, 5 Drawing Sheets

| Adhesion Promoter (100) | | Measurement in liquid volume | Chemical Composition | | Measurement in liquid volume |
|---|---|---|---|---|---|
| First Blend (101) | | 30 – 50 parts | Silane (101a) | | 1 part |
| | | | Water (101b) | | 20-60 parts |
| | | | Acid (101c) | | |
| Second Blend (102) | | 1 part | Isopropyl Alcohol (102a) | | |
| | | | Wetting Agent (102b) | | 20-60 parts |

Fig. 1

| Adhesion Promoter (100) | Measurement in liquid volume | Chemical Composition | Measurement in liquid volume |
|---|---|---|---|
| First Blend (101) | 30 – 50 parts | Silane (101a) with Nano Particles (201) | 1 part |
| | | Water (101b) | 20-60 parts |
| | | Acid (101c) | |
| Second Blend (102) | 1 part | Isopropyl Alcohol (102a) | 1 part |
| | | Wetting Agent (102b) | 20-60 parts |

Fig. 2

ADHESION PROMOTER AND METHOD OF MANUFACTURE THEREOF

BACKGROUND

This disclosure relates to an improved chemical solution. For purposes of this disclosure, various embodiments of the improved solution are discussed. However, such discussion is solely exemplary and non-limiting.

Conventional adhesive promoters act as cleaning and/or priming agents to improve material bonding, but do so with limitations. First, known adhesion promoter agents lack optical clarity. For example, current adhesion promoter mixtures with wetting agents suffer from lack of optical clarity as the combination of chemical ingredients and specific known mixing procedures yield a cloudy or other than optically clear to the human eye mixture. Security and safety transparencies often require an optically clear or optically acceptable appearance to the human eye. Another deficiency with known adhesion promoter agents is the promotion of the bond process with little or no working time after the two surfaces to be adhered are adjoined. Yet another deficiency of other adhesion promoters is that they do little or nothing to strengthen the combined laminates adhered together using the adhesion promoters.

As such, it would be beneficial to have an improved adhesion promoter and method of manufacturing thereof.

SUMMARY

This disclosure relates to an adhesion promoter and method of manufacturing thereof.

Specifically, the disclosure teaches an adhesion promoter comprising a first blend and second blend. The first blend can comprise water and a silane base. The first blend can comprise a first blend ratio of the silane base to water between 1:20 and 1:60, measured in liquid volume. The second blend can comprise isopropyl alcohol.

The disclosure further teaches a method for manufacturing an adhesion promoter. The method can comprise mixing a first ratio between 20 and 60 parts water with 1 part silane base to create a first blend. Next, the method can comprise mixing a second ratio between 20 and 60 parts isopropyl alcohol with between 0 to 1 part wetting agent. Then the method comprises mixing a solution ratio between 30 and 50 parts of the first blend with 1 part the second blend.

The disclosure further teaches an adhesion promoter comprising 1,200 to 2,000 parts water, 30 to 50 parts silane base, and 20 to 60 parts isopropyl alcohol.

The disclosure also teaches suspending carbon nanoparticles within the adhesion promoter providing additional mechanical strength and bonding properties. Specifically, the disclosure teaches an adhesion promoter that can comprise a first blend and a second blend. The first blend can comprise water and a silane base comprising nanoparticles. The second blend can comprise isopropyl alcohol.

The disclosure also teaches another method of manufacturing an adhesion promoter. Specifically, the method includes the steps of encasing nanoparticles in a silane base, and mixing water with the nanoparticles encased in the silane base to create a first blend. The method additionally includes the step of mixing the first blend with the second blend. The second blend can comprise isopropyl alcohol.

The disclosure also teaches an adhesion promoter comprising water, a silane base comprising nanoparticles and isopropyl alcohol.

This disclosure further teaches using the adhesion promoters between substrate layers with a pressure sensitive adhesive to form a spall shield. Specifically, the disclosure teaches a spall shield comprising a first substrate comprising a pressure sensitive adhesive on a first surface of the first substrate, a second substrate attached to the first surface, and an adhesion promoter between the first substrate and the second substrate. The adhesion promoter can comprise a first blend and second blend. The first blend can comprise water and a silane base. The first blend can comprise a first blend ratio of between 1:20 and 1:60, measured in liquid volume. The second blend can comprise isopropyl alcohol.

The disclosure also teaches a spall shield comprising a first substrate comprising a first pressure sensitive adhesive on a first surface of the first substrate, a second substrate comprising a second pressure sensitive adhesive on a second surface. The second substrate attached to the first surface. Furthermore the spall shield can comprise a third substrate attached to the second surface and an adhesion promoter between the first substrate and the second substrate, and between the second substrate and the third substrate. The adhesion promoter can comprise a first blend and second blend. The first blend can comprise water and a silane base. The first blend can comprise a first blend ratio of between 1:20 and 1:60, measured in liquid volume. The second blend can comprise isopropyl alcohol.

The disclosure also teaches a method for manufacturing a spall shield comprising applying an adhesion promoter to a first surface of a first substrate. The adhesion promoter can comprise a first blend and second blend. The first blend can comprise water and a silane base. The first blend can comprise a first blend ratio of between 1:20 and 1:60, measured in liquid volume. The second blend can comprise isopropyl alcohol. The method can additionally comprise the step of attaching a second surface of a second substrate to the first surface. At least one of the first surface and the second surface can comprise a pressure sensitive adhesive.

This disclosure further teaches using the adhesion promoters having nanoparticles between substrate layers with a pressure sensitive adhesive to form a spall shield. Specifically, the disclosure teaches a spall shield comprising a first substrate comprising a pressure sensitive adhesive on a first surface of the first substrate, a second substrate attached to the first surface, and an adhesion promoter between the first substrate and the second substrate. The adhesion promoter can comprise a first blend and second blend. The first blend can comprise water and a silane base comprising nanoparticles. The second blend can comprise isopropyl alcohol.

The disclosure also teaches a spall shield comprising a first substrate comprising a first pressure sensitive adhesive on a first surface of the first substrate, a second substrate comprising a second pressure sensitive adhesive on a second surface. The second substrate attached to the first surface. Furthermore the spall shield can also comprise a third substrate attached to the second surface and an adhesion promoter between the first substrate and the second substrate, and between the second substrate and the third substrate. The adhesion promoter can comprise a first blend and a second blend. The first blend can comprise water and a silane base that comprises nanoparticles. The second blend can comprise isopropyl alcohol.

The disclosure also teaches a method for manufacturing a spall shield comprising applying an adhesion promoter to a first surface of a first substrate. The adhesion promoter can comprise a first blend and a second blend. The first blend can comprise water and a silane base that comprises nanotubes. The second blend can comprise isopropyl alcohol. The method can additionally comprise the step of attaching a second surface of a second substrate to the first surface. At least one of the first surface and the second surface can comprise a pressure sensitive adhesive.

The disclosure further teaches using a spall shield within an improved display. Specifically, the improved display can comprise a film comprising a first pressure sensitive adhesive on a first surface, a second substrate comprising a second surface that attaches to the first surface, and an adhesive promoter between the film and the second substrate. The adhesive promoter can comprise a first blend and second blend. The first blend can comprise water and a silane base. The first blend can comprise a first blend ratio of between 1:20 and 1:60, measured in liquid volume. The second blend can comprise isopropyl alcohol.

The disclosure also teaches a method of manufacturing a display. The method can comprise the steps applying an adhesion promoter to a first surface of a film, and attaching a second surface of a second substrate to the first surface. At least one of the first surface and the second surface can comprise a pressure sensitive adhesive. The adhesion promoter can comprise a first blend and second blend. The first blend can comprise water and a silane base. The first blend can comprise a first blend ratio of between 1:20 and 1:60, measured in liquid volume. The second blend can comprise isopropyl alcohol.

The improved display can also comprise a film comprising a first pressure sensitive adhesive on a first surface, a glass substrate with ITO etched. The glass substrate can comprise a second surface that attaches to the first surface. The improved display can also comprise an adhesive promoter between the film and the glass substrate substantially comprising 1,200 to 2,000 parts water, 30 to 50 parts silane base, and 20 to 60 parts isopropyl alcohol.

The disclosure further teaches using a spall shield within an improved display. Specifically, the improved display can comprise a film comprising a first pressure sensitive adhesive on a first surface, a second substrate comprising a second surface that attaches to the first surface, and an adhesive promoter between the film and the second substrate. The adhesive promoter can comprise a first blend and a second blend. The first blend can comprise water and a silane base comprising nanoparticles. The second blend can comprise isopropyl alcohol.

The disclosure also teaches a method of manufacturing a display comprising nanoparticles. The method can comprise the steps applying an adhesion promoter to a first surface of a film, and attaching a second surface of a second substrate to the first surface. At least one of the first surface and the second surface can comprise a pressure sensitive adhesive. The adhesion promoter can comprise a first blend and a second blend. The first blend can comprise water and a silane base comprising nanoparticles. The second blend can comprise isopropyl alcohol.

The improved display can also comprise a film comprising a first pressure sensitive adhesive on a first surface, a glass substrate with ITO etched. The glass substrate can comprise a second surface that attaches to the first surface. The improved display can also comprise an adhesive promoter between the film and the glass substrate substantially comprising water, a silane base comprising water, and isopropyl alcohol.

BRIEF DESCRIPTION OF THE DRAWINGS

FIG. 1 illustrates an embodiment of an adhesion promoter comprising a plurality of chemicals, in one embodiment organized in a first blend and a second blend.

FIG. 2 illustrates an embodiment of a first blend wherein a silane base can comprise carbon nanoparticles.

DETAILED DESCRIPTION

Figure 3:
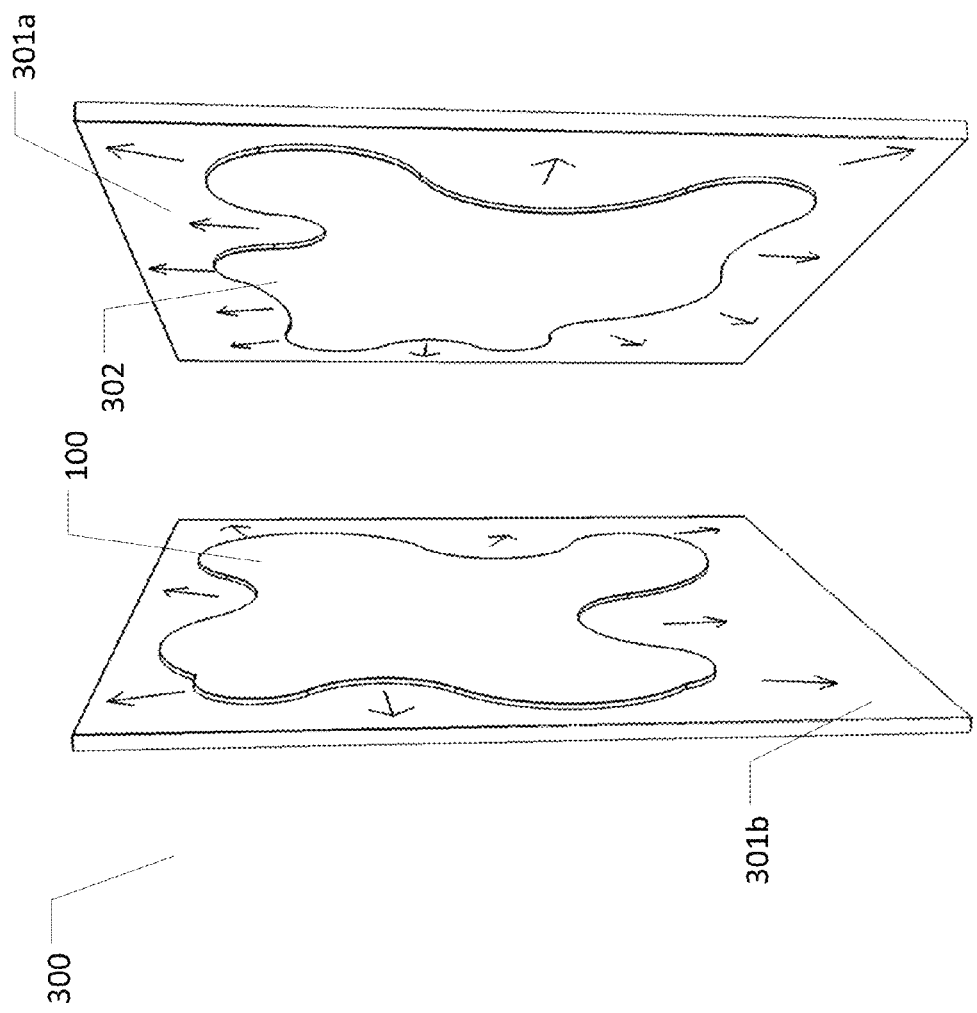
FIG. 3 illustrates an exploded view of a spall shield bonded using an adhesion promoter.

Described herein is an improved adhesion promoter and method of manufacture, therein. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIG. 1 illustrates an embodiment of an adhesion promoter 100 comprising a plurality of chemicals, in one embodiment organized in a first blend 101 and a second blend 102. In one embodiment, adhesion promoter 100 can be a substance that can, along with a pressure sensitive adhesive, enhance bonding of substrates such as glass, acrylics, polycarbonates, plastics, and/or polymers, together.

Glass, in a broad sense encompasses every solid that possesses a non-crystalline structure that transitions toward a liquid state when heated toward that given materials melting point. Glass as discussed within this invention assumes a very broad term as there are many base material combinations for glass that one skilled in the art could devise and utilize. Glass material combinations could result in a transparent, semi-transparent, colored, non-colored, or opaque material.

Polymers as discussed within the invention are large molecules composed of many repeating monomers and can originate from a natural or synthetic base. Polymers known to contain many monomers of a single type are known as homopolymers, and polymers known to contain many monomers from multiple types are known as copolymers. The properties of polymers are broad ranged and consist of both synthetic and natural in base. The physical properties of a polymer are strongly dependent on the size or length of the polymer chain. As the polymer chain length increases, the impact resistance of the material within increases. Longer polymer chains also result in higher viscosity or resistance to flow at melting point temperature for a given material. These longer polymer chains result in increased molecular chain interactions and entanglements which yield physical characteristics such as increased tensile strength which in turn result in improved material strength and toughness.

In another embodiment, adhesion promoter 100 can have a transparent characteristic. In another embodiment, chemical compound can bond to a single or laminated structure to increase the flexibility, durability, fracture resistance and/or impenetrability of a substrate.

First blend 101 can be the first part of the chemical composition used in making adhesion promoter 100, and second blend 102 can make up the second part of adhesion promoter 100. First blend 101 can comprise a silane base 101a and a water 101b. Silane base 101a for purposes of this disclosure is a chemical compound containing silicon. In a preferred embodiment, water 101b can be purified and/or deionized. Such water ensures that contaminates do not interfere with silane base 101a, thus promoting optical clarity.

Second blend 102 can comprise an isopropyl alcohol 102a. In a preferred embodiment, isopropyl alcohol 102a is substantially or completely pure. In another embodiment, second blend can further comprise a wetting agent 102b. Wetting agent 102b can be any chemical substance that when added to a liquid, reduces the surface tension of a liquid that provides wetting agent 102b ability to spread across and penetrate more easily onto the surface of a solid object. In one embodiment, wetting agent 102b can comprise at least 60% of Methyl (Propylhydroxide Ethoxylated) Bis (Primethylsiloxy) Silane.

In a preferred embodiment, the ratio of silane base 101a to water 101b is 1:40, however, the outer ranges can be from 1:20 to 1:60, measured in liquid volume. Silane base 101a and water 101b can be mixed using equipment such as a stainless steel container and a low shear mixer. In one embodiment, before adding silane base 101a, an acid 101c such as acetic acid or an inorganic acid can be added to water 101b to achieve a pH between 3.5 and 4.5. In such embodiment, once water is within the appropriate pH range, silane base 101a can then be added to water 101b, preferably under a low shear mixer. Further, in a preferred embodiment, mixture can be blended from thirty minutes to an hour.

Regarding second blend, in a preferred embodiment, the ratio of wetting agent 102b to isopropyl alcohol 102a is 1:40, but an acceptable range can be as high as 1:20 and as little as no wetting agent, measured in liquid volume. To start the procedure, isopropyl alcohol 102a and wetting agent 102b can be combined and agitated isopropyl alcohol 102a and wetting agent 102b for between ten to twenty minutes, fifteen in a preferred embodiment, using agitation. Agitation methods can include, but are not limited to, mechanical agitation, jet agitation, or bypass agitation.

In a preferred embodiment, first blend 101 can be blended with second blend 102 using a low shear mixer. In such embodiment, this procedure can be done for approximately ten to twenty minutes, fifteen preferably. Further, in a preferred embodiment, the ratio of first blend 101 to second blend 102 can be 40:1, with an acceptable range between 30:1 and 50:1, wherein said mixtures are measured in liquid volume.

In a preferred method, first portion, second portion, and individual chemicals used in adhesion promoter 100 would not be exposed to open air for long periods of time when not in use. Mixtures should have lid or bung on container at all times. Furthermore, stainless steel fittings and pump/equipment can be acceptable storage in many embodiments.

FIG. 2 illustrates an embodiment of first blend 101 wherein silane base 101a can comprise carbon nanoparticles 201. In one embodiment, chemical composition 100 of first blend 101 can comprise carbon nanoparticles 201. Carbon nanoparticles 201 can be lightweight, long, high surface area materials with exceptional mechanical strength allowing even longer molecule chains to form, thus further improving covalent bonds. Carbon nanoparticles 201 may be carbon nanotubes, single walled carbon nanotubes, multi-walled carbon nanotubes, graphene, graphene sheets, graphene nano ribbons, or combinations thereof. The addition of carbon nanoparticles within adhesion promoter 100 can also be beneficial in areas of shock absorption and energy dispersion. Adhesion promoter 100 can be enhanced with carbon nanoparticles, which are lightweight, long, high surface area materials with exceptional mechanical strength. Characteristics of carbon nanoparticles enable them to impart strength, toughness, and crack/impact resistance into a variety of materials. Carbon nanoparticles enable load transfer and energy dissipation between layers and have shown an increase in ballistic resistance performance, shock absorption and improved strength and fatigue life and enhance chemical and mechanical covalent bonding.

Nanoparticles can merely be suspended in silane base 101a, or can be encased in silane base 101a. Suspension merely requires nanoparticles 201 be mixed into silane base 101a. In a preferred embodiment of mixing, nanoparticles can first be wrapped in a surfactant. Such wrapping helps suspend nanoparticles within silane base 101a and resist settling. Such mixing does not create a covalent bond between nanoparticles 201 and silane base 101a.

Encasing, by comparison, describes a covalent bonding of silane base 101a and nanoparticles 201. One method of encasing includes attacking nanoparticles 201 with an oxidizer to prepare the surface of nanoparticles 201. One non-limiting example of an oxidizer includes a halogen group element such as fluorine to produce a halide, which can be directly replaced with a silane bridge. Another oxidizer can be a strong acid that will produce a carboxylic acid on the surface of nanoparticle 201. Carboxylic acid can be converted to an acid chloride using common methods known in the art. Such acid chloride can link to silane base 101a, forming of one or more silane bridges.

This chemical bonding procedure can provide stability and can enhance the functions of silane base 101a. Once nanoparticles 201 are mixed with silane base 101a, silane base 101a with nanoparticles 201 can be mixed with water 101b. As such, appropriate amount of water 101b can be measured before blending water 101b with nanoparticles 201 with silane base 101a mixture.

FIG. 3 illustrates an exploded view of a spall shield 300 bonded using adhesion promoter 100. Spall, for purposes of this disclosure, are flakes of substrate material that have broken off of the substrate or substrate laminate structure as a result of projectile impact onto the substrate surface or edge, or substrate laminate structure surface or edge. Spall may occur as a result of either with or without projectile penetration of the substrate surface or edge, or substrate laminate structure surface or edge as the kinetic energy of the projectile impact onto the substrate material can travel through the substrate or laminate substrate and result in material spall. A spall shield can help protect against such spall. For purposes of this disclosure, projectiles encompasses any object that may come in contact with the substrate surface or laminated substrate surface without regard to mass or velocity. Within this disclosure, projectile is broad enough to even include an object that is stationary, yet comes into contact with a moving spall shield. Examples of a projectile include, but are not limited to, bullets, shrapnel, an axe, the ground.

Spall shield 300 can be a first substrate 301a having a pressure sensitive adhesive 302 backing attached to a second substrate 301b using adhesion promoter 100. Spall shield 300 can be transparent. Substrates 301 can be a substance on which an enzyme acts. Substrates 301 can be a transparent or opaque sheet, laminate, or film (such as a PET film). Furthermore, substrates 301 can comprise of materials, which include silicone, polycarbonate, acrylic, and glass. Pressure sensitive adhesive 302 can be a specialized adhesive, which forms a degree of bond as influenced by the amount of pressure used to apply the adhesive to a surface. In this embodiment, pressure sensitive adhesive 302 can be designed to permanently attach objects together. In one embodiment, pressure adhesive 302 can be initially removable. As such, pressure adhesive 302 can take several hours or days to build adhesion and form a permanent bond with another substance.

Further, pressure sensitive adhesive 302 can be attached at the bottom surface of first substrate 301a. In this embodiment, first substrate 301a and pressure sensitive adhesive 302 can be a single device. As such, adhesion promoter 100 can be applied in between first substrate 301a and second substrate 301b. In this structure, adhesion promoter 100 can be in direct contact with pressure sensitive adhesive 302 that is at the bottom of first substrate 301a, and with the top surface of second substrate 301b.

Pressure sensitive adhesive 302 can be a dry adhesive or a water-activated adhesive. If pressure sensitive adhesive 302 is a dry adhesive, then, in a preferred embodiment, adhesion promoter 100 can be applied second substrate 301b before pressure sensitive adhesive 302 is applied. Further, in a preferred embodiment, adhesion promoter 100 can dry before pressure sensitive adhesive is applied over adhesion promoter 100, onto second substrate 301b. Such process promotes optical clarity and reduces likelihood of streaking.

Covalent bonding is a chemical bond that involves the sharing of electron pairs between atoms. Within the context of this disclosure, a covalent bond occurs between a first substrate having a pressure sensitive adhesive, bonding adhesive, and a second substrate, allowing the long molecular chains between materials to interact and share electrons between atoms within the materials bonded yielding interactive relationships between materials.

In one embodiment, adhesion promoter 100 can encourage the molecular chains between substrate layers to interact and entangle through the pressure sensitive adhesive layer, which chemically reacts with the adhesion promoter, causing those molecule chains to link. Due to the balanced ratios, adhesion promoter 100 can have a longer curing time or chemical flash time to occur. Such embodiment can provide more time for the adhesive promoter to reside in molecular sized material pores and crevices, thus providing more time for molecule chains to link.

Figure 4:
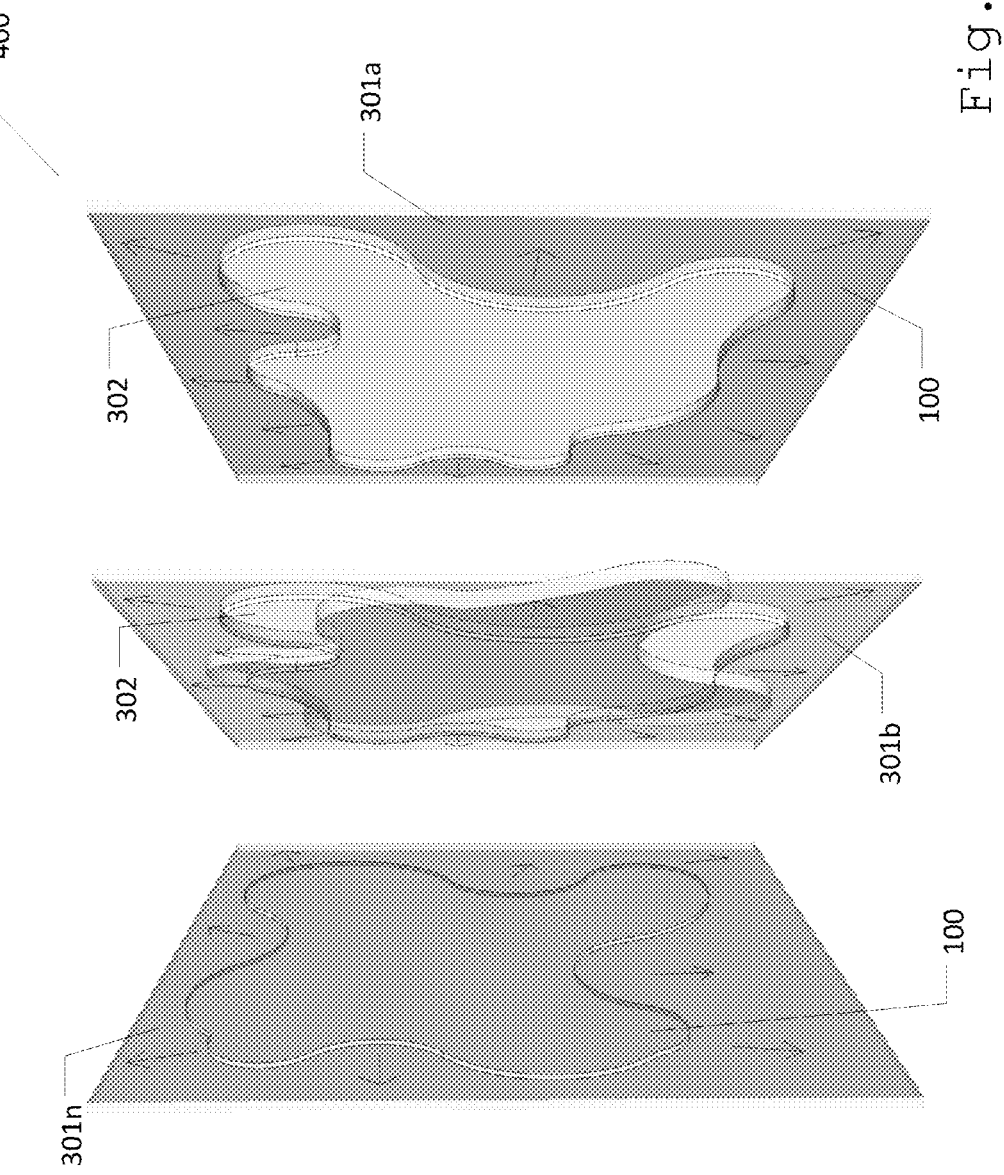
FIG. 4 illustrates an exploded view of a multiple layer spall shield bonded using an adhesion promoter.

FIG. 4 illustrates an exploded view of a multiple layer spall shield 400 bonded using adhesion promoter 100. Multiple layer spall shield 400 can be a plurality of substrates 301 having pressure sensitive adhesive 302 backing attached to each substrate 301 using adhesion promoter 100. In this embodiment, the bottom surface of each substrate 301 that are on top of last substrate 301n can comprise pressure sensitive adhesive 302. In such embodiment, only the bottom surface of last substrate 301n does not comprise pressure sensitive adhesive 302 backing. Moreover, adhesion promoter 100 can be applied in between each substrate 301. This can allow adhesion promoter 100 to build a stronger bond between each substrate 301 once adhesion promoter 100 interact with pressure sensitive adhesive 302.

Figure 5:
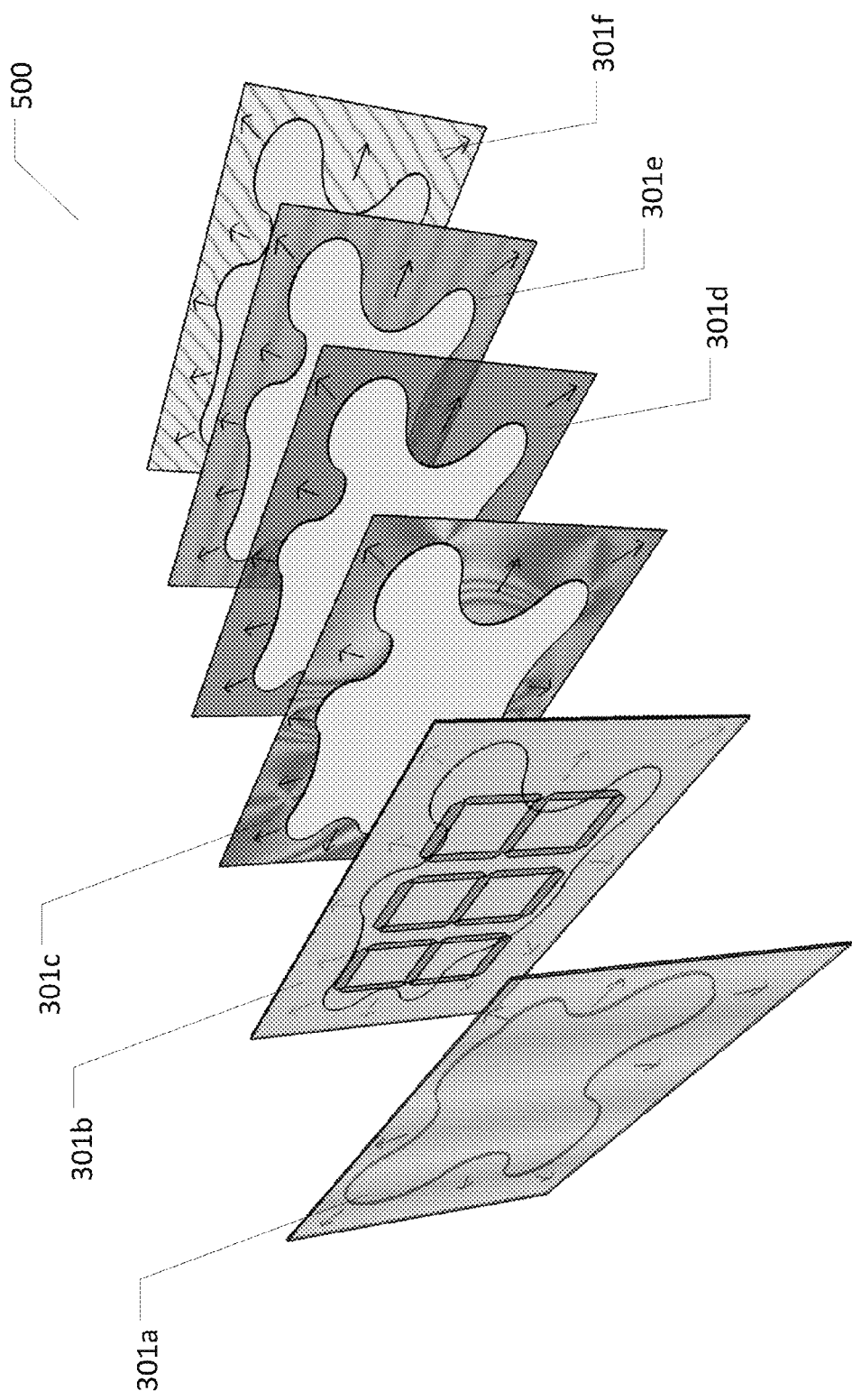
FIG. 5 illustrates a screen comprising various substrates.

FIG. 5 illustrates a screen 500 comprising various substrates 301. In one embodiment, screen can be a liquid crystal display (LCD) screen, however screen is not limited to LCD screens. Screen 500 can be a flat panel electronic display that can comprise a plurality of substrates. FIG. 5 illustrates an exemplary LCD screen multiple substrates 301. In one embodiment, a first substrate 301a and a fifth substrate 301e can each be a positron emission tomography (PET) or a polyester film with pressure sensitive adhesive 302 attached on one or both surfaces. Furthermore, polyester film can have a semi-crystalline resin and be colorless in its natural state. A second substrate 301b and a fourth substrate 301d can be a glass substrate coated with a very thin layer of indium tin oxide (ITO) electrodes or a new polymer, in one embodiment. ITO can be a widely used substrate for its properties such as electrical conductivity and optical transparency. Furthermore, ITO thin films can be used in harsh environments and can withstand temperatures up to 1400 degree Celsius. Third substrate 301c can be a liquid crystal polymer. In such embodiment, third substrate 301c can be a class of aromatic polyester polymers. Furthermore, liquid crystal polymer can be known for its high mechanical strength at high temperature, extreme chemical resistance, inherent flame retardancy, and good weatherability. Sixth substrate 301f can be a reflective surface such as a mirror. As such, sixth substrate 301f can be any artificially altered surface. Moreover in one embodiment, glass substrate of second layer 301b can be coated with silicon dioxide that can improve liquid crystal alignment. In another embodiment, glass can be a borosilicate glass, which has few ions to eliminate interference with the electric field pattern and liquid crystal alignment of Screen 500.

Adhesion promoter 100 can be applied in between various substrates 301 of Screen 500. In one embodiment, adhesion promoter 100 can be a substance that can conduct electricity. As such, adhesion promoter 100 can be applied in between first substrate 301a and second substrate 301b. Concurrently, adhesion promoter 100 can be placed in between fourth substrate 301d, fifth substrate 301e, and sixth substrate 301f to bond each substrate together. Once attached, spacers can be placed in between second substrate 301b and fourth substrate 301c. This can provide the liquid crystal cell the proper thickness. Thus, third substrate 301c can be injected in between substrate 301b and fourth substrate 301c.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. An adhesion promoter comprising
 a homogenous blend of
 a first blend comprising
  water and
  a silane base, wherein said first blend comprises a first blend ratio of said silane base to said water of between 1:20 and 1:60, measured in liquid volume; and
 a second blend comprising
  isopropyl alcohol and;
  a wetting agent, wherein said second blend further comprises a second blend ratio of up to 1 part said wetting agent to every 20 parts said isopropyl alcohol, measured in liquid volume, said wetting agent comprising at least sixty-percent methyl bis silane.

2. The adhesion promoter of claim 1 wherein a solution ratio of said first blend to said second blend is between 30:1 and 50:1, measured in liquid volume.

3. The adhesion promoter of claim 2 wherein said first blend ratio is 1:40.

4. The adhesion promoter of claim 3 wherein said second blend ratio is 1:40.

5. The adhesion promoter of claim 4 wherein said solution ratio is 40:1.

6. The adhesion promoter of claim 2 wherein said second blend is 1:40.

7. The adhesion promoter of claim 6 wherein said solution ratio is 40:1.

8. The adhesion promoter of claim 2 wherein solution ratio is 40:1.

9. A method for manufacturing an adhesion promoter comprising
mixing a first ratio between 20 and 60 parts water with 1 part silane base to create a first blend;
mixing a second ratio between 20 and 60 parts isopropyl alcohol with between 0 to 1 part wetting agent, said wetting agent comprising at least sixty-percent methyl bis silane;
mixing a solution ratio between 30 and 50 parts of said first blend with 1 part said second blend.

10. The method of claim 9 comprising the additional step of adding an acid to said water before mixing said water with said silane.

11. The method of claim 10 wherein the said acid is added to said water until said water achieves a pH between 3.5 and 4.5.

12. The method of claim 9 wherein said water is purified water.

13. The method of claim 9 wherein said water is deionized water.

14. The method of claim 9 wherein said first ratio can be mixed using a low shear mixer.

\* \* \* \* \*